(12) United States Patent
Averill et al.

(10) Patent No.: US 12,496,912 B2
(45) Date of Patent: Dec. 16, 2025

(54) ELECTRIC VEHICLE FOUR-WHEEL DRIVE SHIFTING CONTROL

(71) Applicant: Warn Automotive, LLC, Milwaukie, OR (US)

(72) Inventors: Bryan M. Averill, Portland, OR (US); Adrian Simula, Livonia, MI (US)

(73) Assignee: WARN Automotive, LLC, Milwaukie, OR (US)

( * ) Notice: Subject to any disclaimer, the term of this patent is extended or adjusted under 35 U.S.C. 154(b) by 185 days.

(21) Appl. No.: 18/167,331

(22) Filed: Feb. 10, 2023

(65) Prior Publication Data

US 2023/0256837 A1    Aug. 17, 2023

Related U.S. Application Data

(60) Provisional application No. 63/309,201, filed on Feb. 11, 2022.

(51) Int. Cl.
*B60L 15/20* (2006.01)

(52) U.S. Cl.
CPC ....... *B60L 15/2036* (2013.01); *B60L 2220/42* (2013.01); *B60L 2240/12* (2013.01); *B60L 2260/28* (2013.01)

(58) Field of Classification Search
CPC ............. B60L 15/2036; B60L 2220/42; B60L 2240/12; B60L 2260/28; B60L 2240/461; B60L 2240/486; B60L 2260/26; B60L 2200/18; B60L 2220/46; B60L 15/2054; B60L 1/00–2270/46

USPC .......................................................... 701/22
See application file for complete search history.

(56) References Cited

U.S. PATENT DOCUMENTS

| | | | |
|---|---|---|---|
| 7,264,070 B2 * | 9/2007 | Shimizu ................. | B60K 17/34 180/242 |
| 8,011,464 B2 * | 9/2011 | Samie .................... | B60K 17/02 180/65.6 |
| 9,272,619 B2 * | 3/2016 | Quehenberger ..... | B60W 10/119 |
| 10,000,118 B2 * | 6/2018 | Ogawa ................... | B60K 23/08 |
| 11,498,409 B1 * | 11/2022 | Smith ...................... | B60K 6/28 |
| 12,077,144 B1 * | 9/2024 | Fukada ................. | B60W 10/20 |
| 12,221,091 B2 * | 2/2025 | Boudreau ............. | B60W 20/30 |
| 2004/0034461 A1 * | 2/2004 | Kadota ................. | B60W 10/08 701/67 |
| 2005/0133285 A1 * | 6/2005 | Shimizu ................ | B60W 10/08 180/65.285 |
| 2007/0034428 A1 * | 2/2007 | Janson .................. | B60K 6/365 180/65.235 |
| 2007/0193793 A1 * | 8/2007 | Burrows ............... | B60W 20/40 903/909 |

(Continued)

*Primary Examiner* — Mohamed Abdo Algehaim
(74) *Attorney, Agent, or Firm* — Fish & Richardson P.C.

(57) ABSTRACT

In general, this disclosure relates to a system and method of control for driveline actuators (DLAs) in the powertrain of an electric vehicle to perform shifting between two-wheel drive (2WD) and four-wheel drive (4WD) configurations. Sequential and overlapping shift process is used. The first disconnect is instructed by a vehicle control system to begin its shift, which takes approximately 100 milliseconds to complete. A short period of time after the first disconnect is instructed to begin its shift, but before it has completed the shift, the second disconnect is instructed to begin.

19 Claims, 8 Drawing Sheets

(56) References Cited

U.S. PATENT DOCUMENTS

| | | | |
|---|---|---|---|
| 2010/0094516 A1* | 4/2010 | Sawada | B60K 28/16 |
| | | | 701/55 |
| 2011/0004365 A1* | 1/2011 | Rutquist | B60W 10/06 |
| | | | 903/902 |
| 2011/0105265 A1* | 5/2011 | Yoshimura | B60K 17/3467 |
| | | | 475/205 |
| 2012/0259494 A1* | 10/2012 | Schaeffer | B60K 6/387 |
| | | | 701/22 |
| 2013/0221918 A1* | 8/2013 | Hill | H02J 7/34 |
| | | | 320/109 |
| 2014/0358340 A1* | 12/2014 | Radev | B60W 10/26 |
| | | | 180/65.265 |
| 2015/0053046 A1* | 2/2015 | Ibusuki | B60K 6/20 |
| | | | 903/902 |
| 2017/0028843 A1* | 2/2017 | Ogawa | B60K 17/02 |
| 2018/0099563 A1* | 4/2018 | Nozu | F16D 27/115 |
| 2018/0370356 A1* | 12/2018 | Shigeta | F16D 27/118 |
| 2020/0063806 A1* | 2/2020 | Ekonen | F16D 27/108 |
| 2021/0101477 A1* | 4/2021 | Gaither | F16D 41/00 |
| 2021/0237699 A1* | 8/2021 | Boden | B60T 8/26 |
| 2022/0153117 A1* | 5/2022 | Aulin | B60K 6/365 |
| 2022/0250471 A1* | 8/2022 | Park | B60K 23/0808 |
| 2023/0046751 A1* | 2/2023 | Boudreau | B60W 20/20 |
| 2023/0159017 A1* | 5/2023 | Blakesley | B60L 15/2045 |
| | | | 701/22 |
| 2023/0160443 A1* | 5/2023 | Jones | B60L 3/0023 |
| | | | 701/68 |
| 2023/0249670 A1* | 8/2023 | Oosawa | B60W 10/06 |
| | | | 701/22 |
| 2024/0051515 A1* | 2/2024 | Hemingway | B60W 10/06 |
| 2024/0092167 A1* | 3/2024 | Won | B60K 28/16 |

* cited by examiner

ELECTRIC VEHICLE FOUR-WHEEL DRIVE SHIFTING CONTROL

CROSS-REFERENCE TO RELATED APPLICATIONS

This application claims priority under 35 U.S.C. § 119 to U.S. Application Ser. No. priority to U.S. Application No. 63/309,201, filed on Feb. 11, 2022, the contents of which is hereby incorporated by reference.

TECHNICAL FIELD

This disclosure generally relates to automatic shifting processes for four-wheel drive electric vehicles.

BACKGROUND

In a four-wheel drive or all-wheel drive vehicle, it is desirable to operate the vehicle in two-wheel drive when sufficient traction exists to allow the vehicle to be propelled by only two wheels. This allows for reduced energy consumption compared to propulsion by all four wheels. When poor traction conditions exist, such as icy roads, it's desirable to propel the vehicle by all four wheels. A disconnection device between the wheels and axles or partway in the axle assembly allows for shifting between two-wheel drive and four-wheel drive in such vehicles.

Traditionally, both left and right wheel disconnects are shifted simultaneously. Since the time to complete a shift is slightly different for left and right wheel disconnects, due to natural variation, the occurrence of the left or right side connecting first is random. This arrangement has been acceptable in internal combustion engine vehicles where the control system is not particularly sophisticated or sensitive and the randomness of left verses right connection is not important.

In electric four-wheel drive vehicles, the control system is more sophisticated, and sensors are can be used to determine the exact operating condition of systems and components. As such, the randomness of left verses right connection is an undesirable characteristic.

SUMMARY

The present disclosure involves systems, methods, and apparatuses for controlling driveline actuators (DLA) in the powertrain of an electric vehicle to perform shifting between two-wheel and four-wheel drive configurations in a manner that prevents undesirable randomness in coupling order between right and left wheels. These include an electric vehicle, and a method including receiving an input instructing the vehicle to shift from a two-wheel configuration to a four-wheel configuration, the instruction coming from a control system of an electric vehicle. Responsive to the input, a first drive-line actuator (DLA) is controlled to initiate a first process for connected a first wheel of the electric vehicle to a drive axle of the electric vehicle. After a time delay, a second DLA is controlled to initiate a second process for connecting a second wheel of the electric vehicle to the drive axle, the time delay being shorter than a total time to complete the first process.

Implementations can optionally include one or more of the following features.

In some instances, the time delay is between 10 ms and 250 ms.

In some instances, the time delay is approximately 50 ms.

In some instances, an electric motor is started, the electric motor coupled to the drive axle concurringly with controlling the first DLA to initiate the first process for connecting the first wheel of the electric vehicle to the drive axle of the electric vehicle. In some instances, the first DLA is controlled to initiate the first process for connecting the first wheel to the drive axle simultaneously with starting the electric motor.

In some instances, the time delay is a first delay and controlling the first DLA to initiate the first process for connecting the first wheel to the drive axle is performed after a second time delay has elapsed from starting the electric motor.

In some instances, the second time delay is longer than the first time delay.

In some instances, the second time delay is between 20 ms and 500 ms.

In some instances, a ration between the second time delay and the first time delay is between 3:2 and 8:1. In some instances, the ratio is 2:1.

In some instances, the time delay varies based on a speed of the electric vehicle. In some instances the speed is longer for higher vehicle speeds than for lower vehicle speeds.

In some instances, the first process includes determining a rotational speed differential between the first wheel and the drive axle, sending a control signal to a motor of the electric vehicle to adjust the speed differential to within a predetermined threshold, and sending an actuating signal to the first DLA to engage the first wheel with the axle.

The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

In general, the disclosure relates to a system and method of control for driveline actuators (DLAs) in the powertrain of an electric vehicle to perform shifting between two-wheel drive (2WD) and four-wheel drive (4WD) configurations. As noted above, when shifting an internal combustion engine vehicle between 2WD and 4WD both left and right wheel disconnects are traditionally shifted simultaneously. However, the actual order of the engagement of each wheel is unpredictable. While such unpredictability is tolerable for internal combustion engine vehicles, in electric four-wheel drive vehicles, the control systems are more sophisticated, and unpredictable engagement order between left and right wheels of left verses right connection is an undesirable characteristic.

For many electric vehicles it is important to be able to determine with certainty which wheel (right or left) will connect first when engaging 4WD. To accomplish certainty in this regard, the left and right disconnects can be shifted sequentially. In other words, one side (e.g., the left side) is allowed to complete its shift motion before the other side (e.g., right side) shift motion begins. In this way, one side is defined as the first side and the other side is second in the shift sequence. A drawback of this strategy is that the total time for both sides to complete a shift and the vehicle is fully in the four-wheel-drive mode may be double the time of a traditional simultaneous shift strategy.

To achieve both certainty in left verses right wheel engagement when shifting into 4WD and low overall time to complete the shift to 4WD, sequential and overlapping shift process is presented herein. In brief, the first disconnect (e.g., left side) is instructed by a vehicle control system to begin its shift, which takes approximately 100 milliseconds to complete. A short period of time after the first disconnect is instructed to begin its shift, but before it has completed the shift, the second disconnect is instructed to begin. For example, the second disconnect may be instructed to begin 30 milliseconds after the first. After 100 milliseconds has elapsed, the first disconnect has completed its shift, and after an additional 30 milliseconds, the second disconnect has completed its shift. In this manner the total system shift time is 130 milliseconds, 70 milliseconds less than if the first and second disconnects were shifted one after the other. The time described is for the purpose of explanation. The exact time may be different depending on the specific application, but the principle is the same.

Figure 1A:
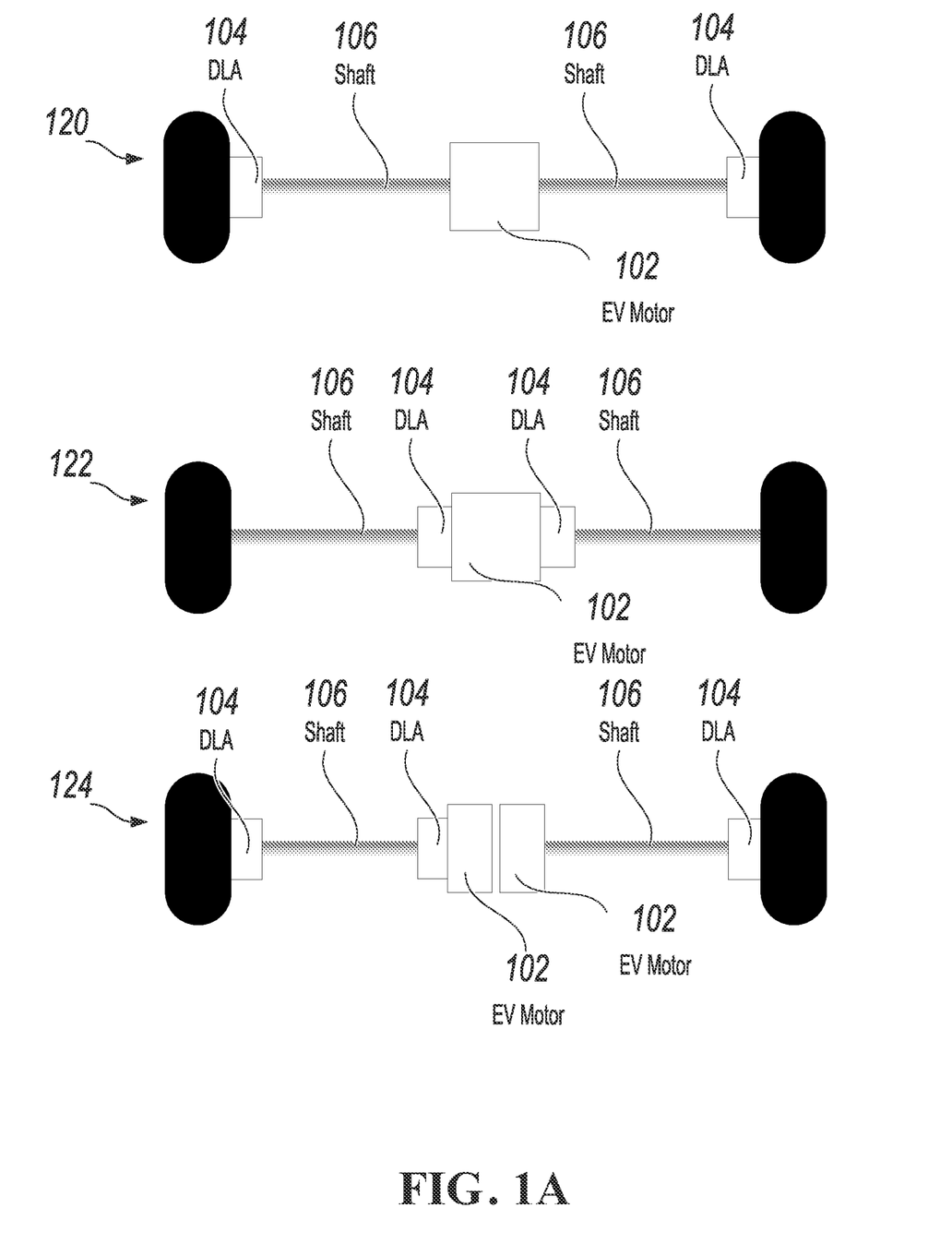
FIGS. 1A-1C illustrate example powertrain architectures including driveline actuators (DLAs) which can be used in an implementation of this disclosure.
Figure 1B:
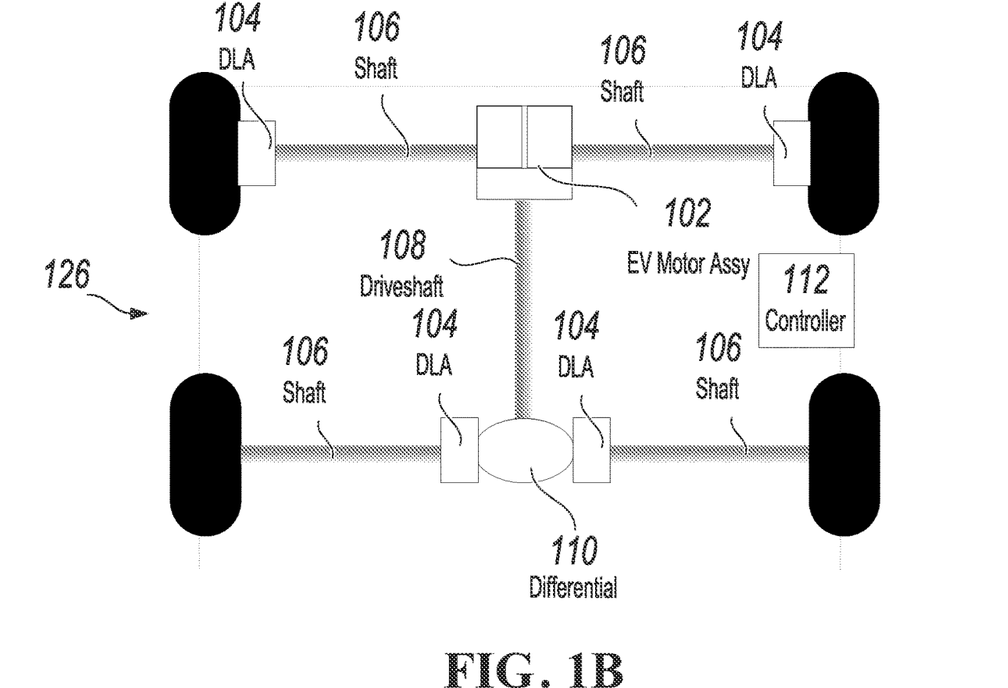

FIGS. 1A and 1B illustrate example powertrain architectures including driveline actuators (DLAs) which can be used in implementations of this disclosure. FIG. 1A illustrates various exemplary implementations of axles with DLAs. Axle 120 is in a bi-axle configuration with two shafts 106 that receive torque from an electric motor or EV motor 102. Axle 120 includes two DLAs 104 located near the wheels, which can be advantageous in that it maximizes the amount of rotational mass that is disconnected from the wheel. For example, in a low demand, cruise situation, where the EV motor 102 is not required, a the vehicle can disconnect both DLAs 104 and allow the wheels to free spin, while bringing the shafts 106 to a full stop, therefore reducing friction losses as compared to a similar configuration where the shafts rotate with the wheels.

Example axle 122 shows a different potential configuration, with the DLAs 104 located near the EV motor 102. In some implementations it may be desirable to keep the weight of the vehicle centralized. In some implementations, where the DLAs 104 are pneumatically or hydraulically actuated, situating them near the EV motor 102 can minimize the length of pressure tubing required in the vehicle.

Example axle 124 shows a vehicle axle with two EV motors 102, one for each shaft 106. Similarly to example axles 122 and 120 above, the DLAs 104 can be situated near the EV motor 102 or the wheel, or in some cases, somewhere between. Additionally, as shown on the left shaft of example axle 124, two DLAs 104 are installed, with one near the wheel and one near the EV motor 102. In some implementations, four, or more DLAs per axle can be used.

FIG. 1B illustrates an example powertrain 126 showing a simplified powertrain for an EV with four wheels. Example powertrain 126 includes a single EV motor 102 or motor assembly which applies torque to all four vehicle wheels. In the illustrated example, the rear axle is divided by a differential 110, which permits the rear wheels to rotate at different speeds (e.g., during a turn). In FIG. 1B the rear axle includes two DLAs 104 in an inboard position near the differential 110. The forward axle includes two DLAs 104 in an outboard position near the wheels.

Figure 1C:
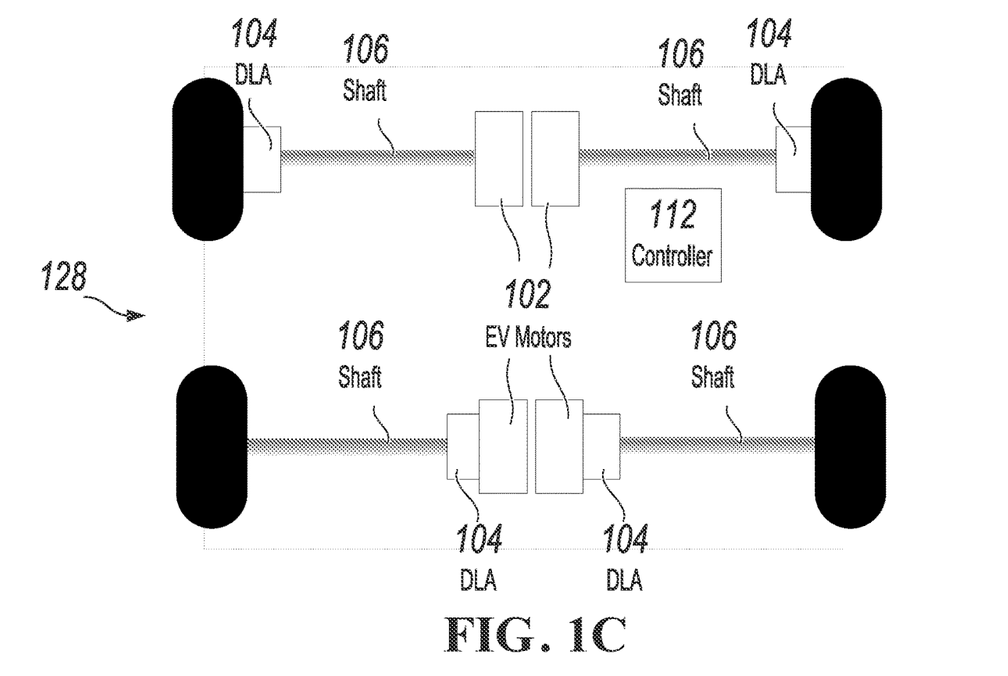

Example powertrain 126 (and 128 below) include a controller 112, which can be configured to sense or receive sensed data from multiple sources, and actuated the DLAs 104 in the vehicle according to FIG. 1C illustrates an example powertrain 128 which includes four EV motors 102. Each EV motor 102 powering an individual shaft 106 with a DLA 104 and wheel. While FIGS. 1A-1C illustrate some example powertrain configurations, it should be noted that many different configurations are also suitable. For example, a three motor configuration with two motors power a rear axle and a single motor powering a front axle. Additionally, while each example powertrain shown includes a four wheeled powertrain, fewer or more wheels are also possible. For example, a three wheeled vehicle, six wheeled vehicle, or other configurations are not outside the scope of the present disclosure.

Figure 1D:
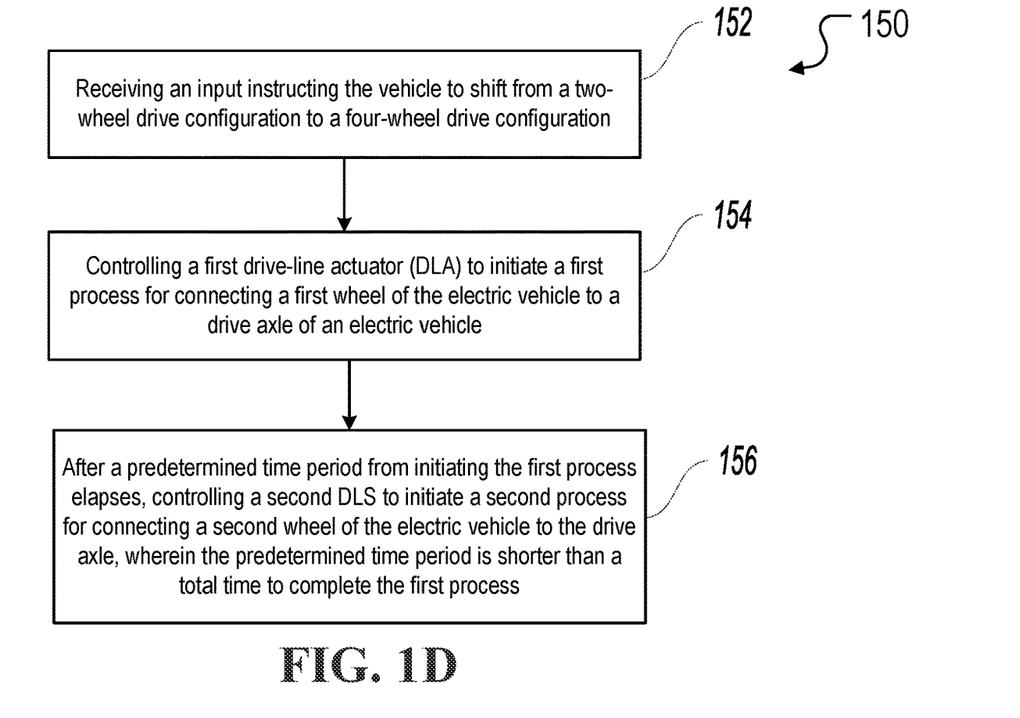
FIG. 1D is a flowchart depicting an example process for controlling a shifting operation according to implementations of the present disclosure.
Figure 1E:
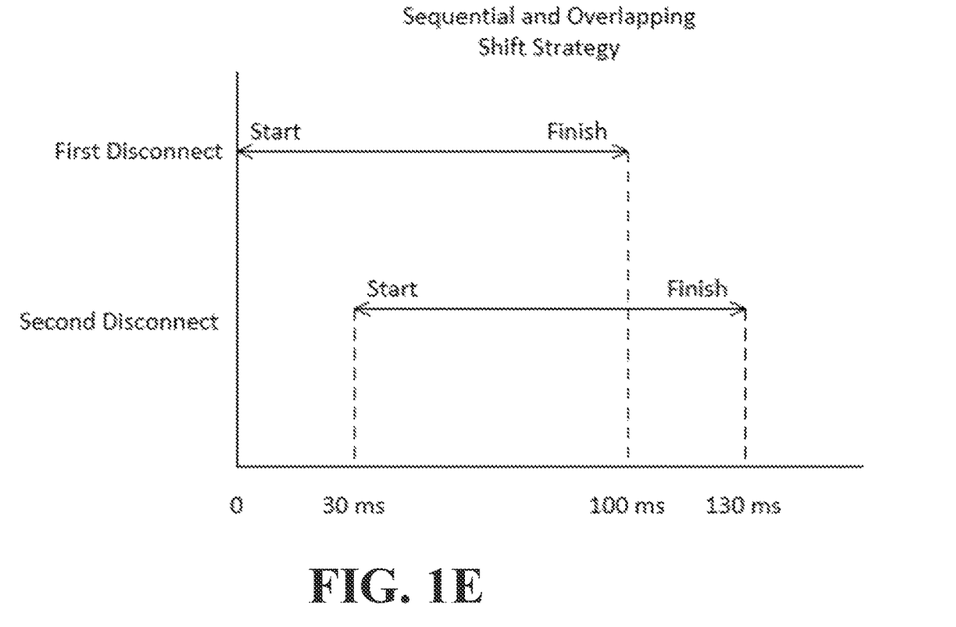
FIG. 1E illustrates a timing diagram for a shifting process according to implementations of the present disclosure.

FIG. 1D is a flowchart depicting an example sequential and overlapping shift process 150 for shifting an electric vehicle from 2WD to 4WD. FIG. 1E illustrates a timing diagram for the example sequential and overlapping shift process 150. The process 150 begins when a vehicle control system (e.g., controller 112) receives an input instructing the vehicle to shift from a two-wheel drive configuration to a four-wheel drive configuration (152). For example, the vehicle may have in input such as a button, touch screen input, or switch that allows a user to shift the vehicle between 2WD and 4WD. Activation of the input sends a signal to the controller 112 to activate DLAs 104 to couple the front wheels to a drive axle (e.g., shaft 106).

In response to the input, the controller 112 employs a sequential and overlapping shift process to achieve both certainty in the engagement timing for the left and right wheels and to minimize the overall time to complete the shift to 4WD. The controller 112 controls a first DLA 106 (e.g., for the left wheel) to initiate a first process for connecting the first wheel to the drive axle 106 (154). For example, the controller 112 supplies power to a motor or hydraulic actuator to in the DLA 106 to begin translating a mechanical coupling into position to engage the left wheel with the drive axle 106.

The controller 112 controls a second DLA 106 (e.g., for the right wheel) to imitate a second process for connecting the second wheel to the drive axle 106 after a predetermined time delay has elapsed from initiating the engagement of the first DLA (156). FIG. 1E depicts a timing diagram for an exemplary shifting sequence. For example, the controller 112 delays initiating the engagement of the right side DLA 106 for a predetermined period of time to ensure that the left wheel will be engaged before the right wheel. After the delay period, the controller 112 initiates engagement of the right wheel. For example, the controller 112 supplies power to a motor or hydraulic actuator to in the DLA 106 to begin translating a mechanical coupling into position to engage the right wheel with the drive axle 106.

The predetermined time delay is long enough to ensure that the first initiated DLA completes the coupling process with the first wheel before the second initiated DLA completes the coupling process with the second wheel, but is shorter than the coupling process for one wheel. For example, the predetermined time period can be between 10 ms and 250 ms. In some implementations, the time delay is approximately 50 ms.

In some implementations, the predetermined time period varies based on a speed of the electric vehicle. For example, the time period can be increased when the vehicle is traveling at high speed to allow time for the drive axle to accelerate to the speed of the front wheels. This may be particularly important for an electric vehicle with independent front and rear motors.

Furthermore, a 4WD electric vehicle may have a secondary motor to drive the front wheels. When the vehicle is operated in 2WD this motor may be stationary, so the vehicle's control system must start the secondary motor and accelerate the drive axle that is driven by the secondary motor up to a rotational speed comparable to that of the front wheels prior to engaging the DLAs for the front wheels. In some implementations, the shifting process for the front wheels includes applying power to (e.g., starting and accelerating) an electric motor that drives the front axle concurrently with initiating the shifting process for the first wheel. In this way, the front axle is accelerates while the wheel coupler is being translated into position. In some implementations, the electric motor is started simultaneously with initiating the DLA coupling process for the first wheel. In some implementations, the vehicle controller employs a starting delay period between starting the electric motor and initiating the DLA coupling process for the first wheel, e.g., to allow time for the associated drive axle to accelerate. In some implementations, the starting delay period is between 20 ms and 500 ms (e.g., 100 ms).

In some implementations, the starting time delay is coordinated with the time delay between initiating coupling with the first wheel and initiating coupling the second wheel. For clarity the time delay between starting the motor and imitating the DLA coupling process for the first wheel will be referred to as the "starting time delay" and the time delay between initiating coupling with the first wheel and initiating coupling the second wheel will be referred to as the "coupling time delay". In some implementations, the starting time delay and coupling time delay can be selected as a ratio of each other. For example, the starting/coupling time delays can be 20 ms: 10 ms, 100 ms: 50 ms, or 500 ms: 250 ms (e.g., a 2:1 ratio). The ratio between starting and coupling time delays can range from 3:2 and 8:1, for example.

In some implementations, the controller 112 or DLA 106 may employ additional processes such as those described in reference to FIGS. 4 and 5 below to achieve a desired rotational speed and/or torque differential between the wheel and the drive axle 106.

Figure 2:
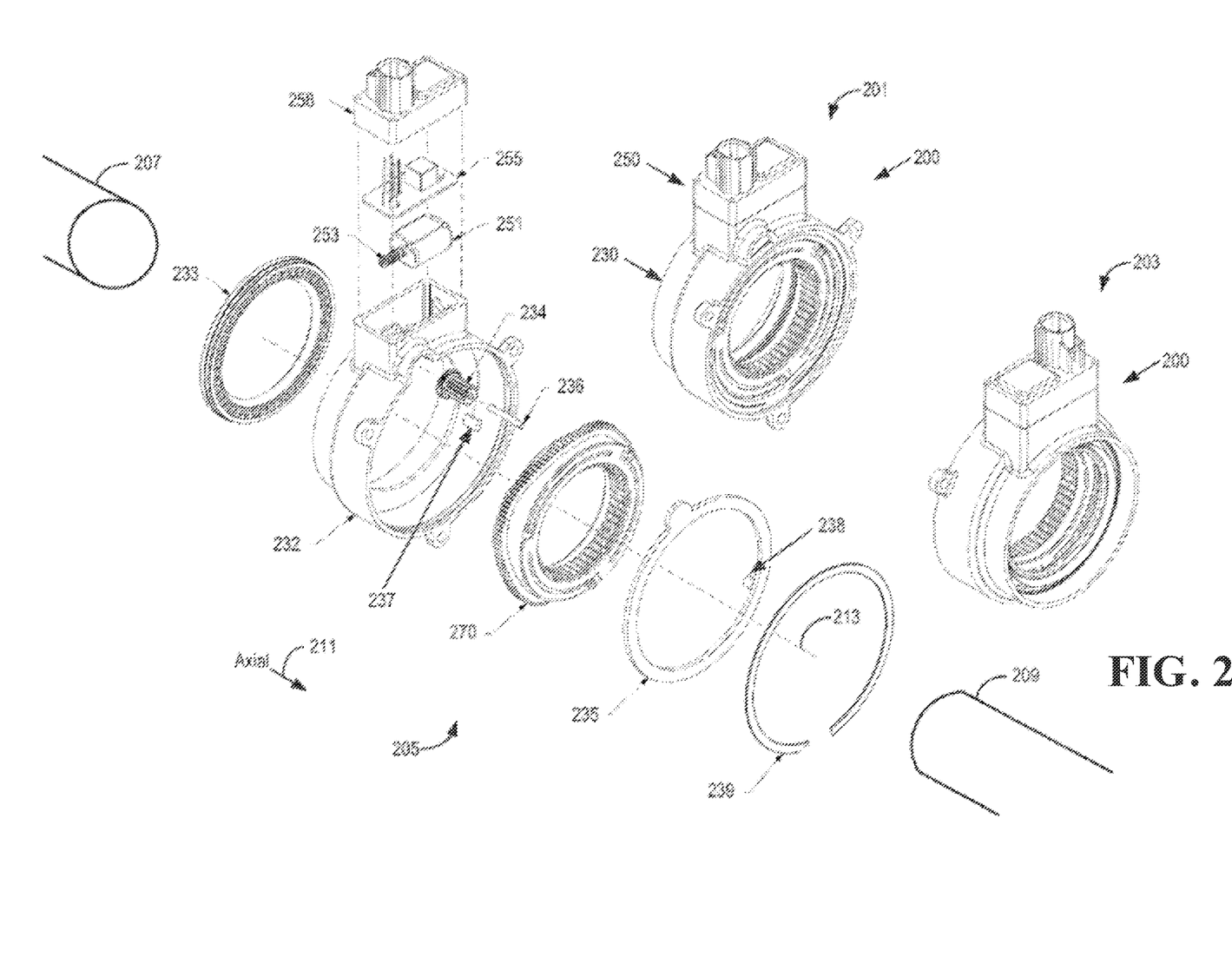
FIG. 2 illustrates an example DLA which can be used in an implementation of this disclosure.

FIG. 2 illustrates an example DLA which can be used in an implementation of this disclosure, although various different types of DLAs are compatible with implementations of the present disclosure. FIG. 2 shows an exploded view 205, as well as a first assembly view 201 and second assembly view 203, of a DLA 104 (referred to herein as disconnect 200). The first assembly view 201 and second assembly view 203 are oppositely facing views of the assembled disconnect 200. Disconnect 200 comprises a generally circular shape with a shifter structure 230 and a control assembly 250, the control assembly 250 attached to the outside of the shifter structure 230. For example, the control assembly 250 may be coupled to a single side (e.g., top side) of an outside surface of the shifter structure 230. In other embodiments, the control assembly 250 may be coupled at another position along the outside surface of the shifter structure 230 (such as the bottom side). The top side and bottom side of the shifter structure 230 may be defined with respect to a surface on which a vehicle in which the disconnect 200 is installed sits.

As seen in the exploded view 205 of disconnect 200, control assembly 250 includes an electric motor 251. The electric motor 251 turns an output shaft that is equipped with a worm 253 for use in a worm drive. It is noted here that motor 251 may only rotate in a single direction during a series of shifting modes without the ability to reverse directions. Thus, the driving direction of the motor 251 may not change during a period of time. Furthermore, control assembly 250 includes a controller 255 (e.g., hub controller) which may be configured to operate disconnect 200 while communicating with vehicle systems and controllers external to disconnect 200. It is noted that controller 255 is separate from a main vehicle controller or other similar devices of the vehicle. However, the controller 255 may communicate with and receive commands from a vehicle or engine controller. Either external or attached adjacent to controller 255, a magnetic bi-polar sensor may be positioned. Magnets positioned around the circumference of shifter assembly 270 may rotate with the shifter assembly 270 to align with the bi-polar sensor such that the sensor can be triggered by one of the magnets within a sensing range. Finally, a cap 258 may enclose the controller 255 and motor 251 (with the worm 253) to form the shape of control assembly 250.

Shifter structure 230 comprises a generally circular and ring-like shape for the purpose of engaging (and disengaging) two generally circular input components, such as shafts or axles. As shown in FIG. 2, the disconnect 200 engages and disengages a rotatable, first shaft 207 and a rotatable, second shaft 209. In this example, the input components (e.g., first shaft 207 and second shaft 209) are input into disconnect 200 from both ends along the axial direction, as shown by the axial arrow 211 in FIG. 2. For example, a first input component (e.g., first shaft 207) may be positioned adjacent to a first end of the disconnect 200 and a second input component (e.g., second shaft 209) may be positioned adjacent to a second end of the disconnect 200, the first end opposite the second end with respect to the axial direction. A housing 232 is shown in FIG. 2 that provides an outer structure for protecting the internal components of disconnect 200. The housing 232 may aid in preventing dust and other contaminants from interfering with the function of the disconnect 200. A worm gear 234 is located inside housing 232 and is positioned to engage with worm 253 in order to provide rotation of worm gear 234 upon powering worm 253 via motor 251. The combination of worm 253 and worm gear 234 is also referred to as the worm drive. Rotation of the worm 253 (activated by motor 251) causes rotation of the worm gear 234. Particularly, worm gear 234 rotates about an axis parallel to the axial direction shown in FIG. 2 while worm 253 rotates about an axis perpendicular to the axial direction. In other words, the axes of rotation of worm 253 and worm gear 234 are perpendicular. Further, the axis of rotation of the worm gear 234 is parallel to a rotational axis 213 of the disconnect 200, where the rotation axis 213 is also a rotational axis of the first shaft 207 and second shaft 209.

A shifter assembly 270 is also located in housing 232 and provides the shifting motion that defines the operation of disconnect 200, that is, selectively connecting and disconnecting two rotating components (such as shafts). A pin 236 is located inside housing 232 and is positioned to couple the worm gear 234 to the housing 232. Also, a cam guide (e.g., may also be referred to herein as a fixed cam guide or a fixed guide) 237 is fixed inside the housing. Two additional fixed cam guides are positioned similarly to cam guide 237, along the inside of the housing (blocked from view in FIG. 2). The additional fixed cam guides are also fixed inside the housing so that none of the cam guides (including cam guide 237) move relative to movement of the shifter assembly 270). Cam guide 237 and the two additional fixed cam guides are stationary guides and may be part of the same material as housing 232. A sealed end of housing 232 is at least partially covered by a seal 233. A shaft or axle, such as first shaft 207, can be inserted through the center of seal 233, where the seal 233 may be sized to provide a tight connection between the seal and shaft. The tight connection may substantially prevent debris from entering the inside of housing 232 while still allowing the shaft to rotate and the seal 233 to remain stationary and attached to the housing 232. The sealed end of housing 232 that includes seal 233 may enclose the first shaft 207 (first input component). A cam keeper 235 is located adjacent to an axial-facing surface of the shifter assembly 270, where the cam keeper includes a holding tab that can be inserted into a groove formed in the housing such that the keeper is held stationary relative to housing 232 (without rotating). Shifter assembly 270 may be generally circular in shape with a central axis that is parallel to the axial direction and collinear with the central axes of other components, such as seal 233, cam keeper 235, and housing 232. Furthermore, cam keeper 235 includes three fixed guides (e.g., fixed cam guides) 238 that are stationary and positioned to protrude from the cam keeper towards shifter assembly 270. Only one cam guide 238 is visible in FIG. 2. Finally, a retaining ring 239 (e.g., lock ring) may be positioned outside the cam keeper 235 to hold the other components inside housing 232 and reduce undesired movement during vehicle operation. The end of housing 232 opposite to the sealed end containing seal 233 is located in the more positive axial direction and includes cam keeper 235 and retaining ring 239, as seen in the exploded view 205 of FIG. 2. The opposite end of housing 232 may enclose the second shaft 209 (second input component).

Figure 3:
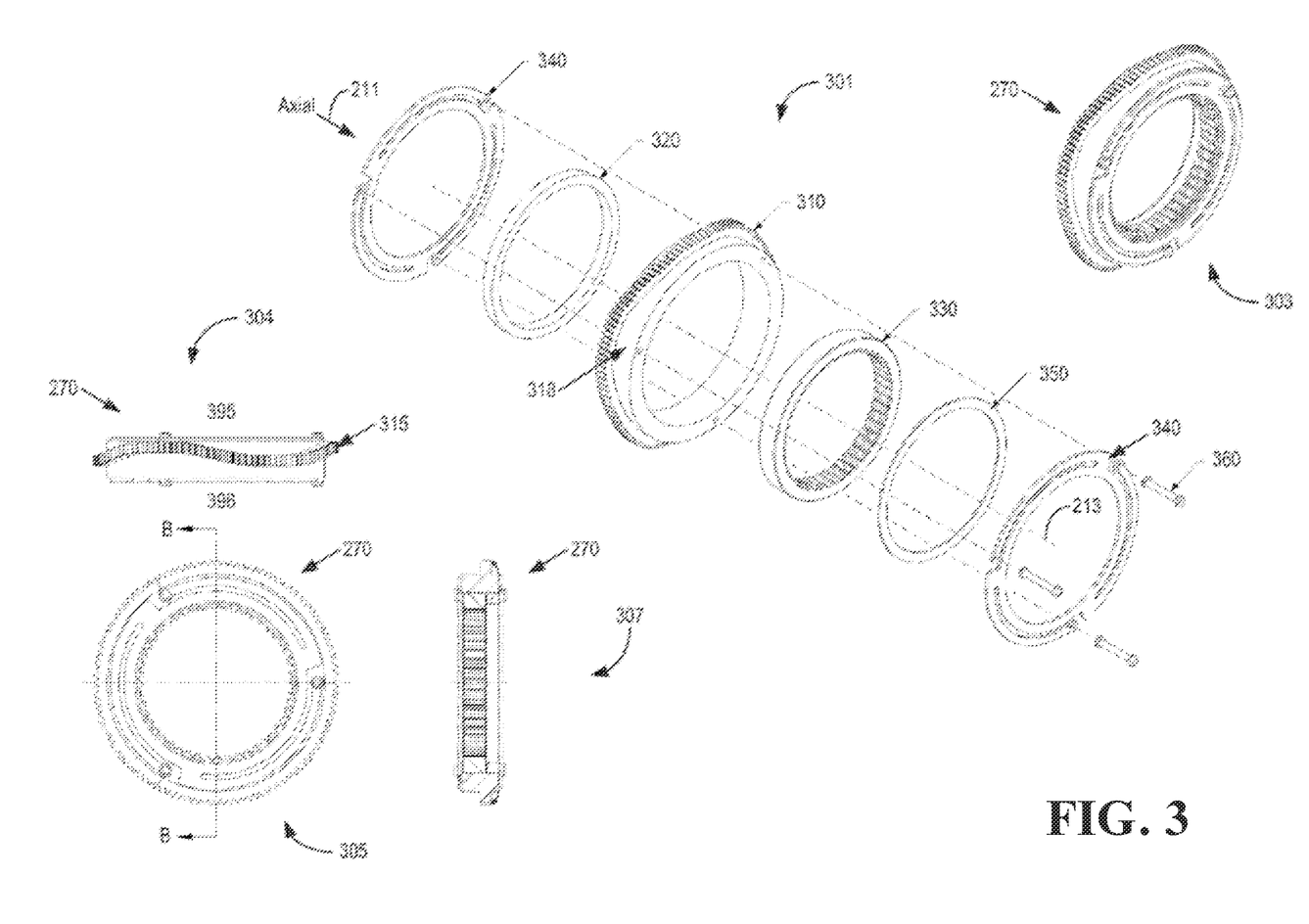
FIG. 3 illustrates an example shifter assembly for a DLA which can be used in implementation of this disclosure.

FIG. 3 shows an exploded view 301, an assembly view 303, a top view 304, a side view 305, and a sectional view 307 (sectional view 307 is taken along section B-B, as shown in side view 305) of shifter assembly 270 of FIG. 2. The shifter assembly includes a shifter gear 310 that forms the outside shape (e.g., outer portion) of the shifter assembly 270. The outer surface of shifter gear 310 is covered by a non-planar gear track 315 that oscillates between the two ends of the shifter gear 310, the two ends being first end 395 and second end 396. The two ends 395 and 396 are located axially on either end of shifter gear 310, as shown in top view 304. The gear track 315 circumscribes the outer surface of shifter gear 310 without following the linear profile of the two ends. Said another way, the gear track 315 is continuous around an outer circumference of the shifter gear 310, the gear track 315 having a substantially sinusoidal path as it travels around the outer circumference of the shifter gear 310. Additionally, the gear track 315 may pass both above a below a vertical centerline of the shifter gear 310, the vertical centerline perpendicular to the axial direction (e.g., perpendicular to the axis of rotation of the shifter gear 310, where the axis of rotation of the shifter gear 310 is the rotational axis 213 of the disconnect 200).

Shifter assembly 270 also includes a clutch ring 330 that is positioned on the inner surface of shifter gear 310. The clutch ring 330 includes gear teeth that may mesh with the gear teeth of an external shaft or axle. The clutch ring 330 includes an inner surface and an outer surface, the inner surface including the gear teeth of the clutch ring 330. An outer diameter of the clutch ring 330 may be smaller than an inner diameter of the shifter gear 310 such that the clutch ring 330 fits within the shifter gear 310. Also, the clutch ring 330, while located inside shifter gear 310, is free to rotate at a different rate than shifter gear 310 and can rotate while the shifter gear 310 is stationary. However, clutch ring 330 is constrained to move axially with the shifter gear (and shifter assembly 270). A first washer 320 is located on one side of shifter gear 310 while a second washer 350 is located on the opposite side of shifter gear 310, adjacent to clutch ring 330. Lastly, two springs 340 are included in the shifter assembly, with one spring located on either end of the shifter assembly, as seen in FIG. 3. As one example, the two springs 340 may be finger springs. For example, as shown in FIG. 3, each spring 340 contains three flexible arms that bend to provide the flexible, reversible force of the springs. However, a different type of spring other than a finger spring may be used for springs 340. Springs 340, along with washers 320 and 350, may constrain clutch ring 330 to move axially with the shifter assembly 270. As shown in FIG. 3, only a single washer (e.g., washer 320 or washer 350) is positioned between the shifter assembly 270 and one of the springs 340. A number of rivets 360 may be inserted through the components of the shifter assembly in order to hold the shifter assembly together as a single unit.

The oscillations (e.g., undulations) of gear track 315 complete multiple cycles around the periphery of shifter gear 310. A complete cycle is defined as the length of gear track 315 that oscillates from a point adjacent to first end 395, away towards a point adjacent to second end 396, and finishes at another point adjacent to first end 395. The orientation of shifter assembly 270 with gear track 315 shows one complete cycle of the gear track. The oscillations of gear track 315 may be continuously curved (sinusoidal) in some embodiments, while in other embodiments the gear track 315 may include inclined, generally linear ramps joined by flat, linear sections. Other gear track shapes may be possible that complete multiple cycles around the periphery of shifter gear 310. Gear track 315 may be in contact with worm gear 234 of FIG. 2 such that power from worm gear 234 provided by motor 251 is transmitted into gear track 315 to cause rotation of shifter assembly 270. More specifically, teeth of the worm gear 234 may mate and interlock with teeth of the gear track 315. As such, rotation of the worm gear 234 causes rotation of the gear track 315 and subsequently the shifter assembly 270. In addition to providing rotation, shifter assembly 270 may move linearly in the axial direction as shown by the axial arrow 211 in FIG. 3. Specifically, shifter assembly 270 may move back and forth along the axial direction relative to the stationary housing 232 with the attached control assembly 250.

Rotational and axial movement of shifter assembly 270 is actuated by worm gear 234 engaging with gear track 315. As seen in FIG. 3, gear track 315 protrudes radially away from shifter gear 310, forming a cam profile 318 which may be defined as the surfaces on either side of the gear teeth of gear track 315. More specifically, the gear track 315 extends outwardly away from the outer surface of the shifter gear 310 (in a direction perpendicular to the rotational axis of the shifter assembly 270). Fixed cam guides 237 contact cam profile 318 on one side of shifter gear 310 and fixed cam guides 238 contact the cam profile on the opposite side of shifter gear 310. In this way, gear track 315 is effectively trapped (e.g., disposed) between the fixed cam guides (e.g., fixed guides) 237 and 238. Therefore, as shifter assembly 270 rotates, fixed cam guides 237 and 238 slide against cam profile 318, thereby causing the shifter assembly to move axially.

In one example, axial cam profile 318 may be divided into three equal portions, where each portion includes a 4×4 and a 4×2 position along with cam ramps in between the positions. In particular, the three equal portions form three complete cycles of gear track 315, wherein the 4×4 and 4×2 positions are the points closest to first end 395 and second end 396 of shifter gear 310, respectively. Correspondingly, in this example, gear track 315 also contains three equal portions identical to the three equal portions of axial cam profile 318. Therefore, as motor 251 operates worm 253 and worm gear 234 in a single or first direction, gear meshing between worm gear 234 and gear track 315 may cause rotation and axial movement of shifter assembly 270. In this way, motor 251 may be driven in the single direction during shifts to 4×2 and 4×4 modes. The spinning direction of motor 251 may be reversed to a second direction when vehicle direction changes such that the first rotating component also changes direction. It may be desirable to rotate shifter assembly 270 in the same direction as the rotation of the powered, first rotating component. As such, when vehicle moving direction changes, motor 251 may also change direction. In this way, the single or first spinning direction of motor 251 may be maintained as long as the vehicle is moving in a corresponding direction. In a similar fashion, as explained in further detail later, the spinning direction of motor 251 may depend on if disconnect assembly 200 is placed on the left or right side of the vehicle, such as near wheels 103 or 104.

Springs 340 shown in FIG. 3 are attached to either side of shifter gear 310 and aid in holding clutch ring 330 within the shifter assembly. For example, during a shift to the 4×4 position, if the teeth of clutch ring 330 are not aligned with the mating teeth of an external rotating component (e.g., a shaft or an axle), then the springs will deflect to allow clutch ring 330 to remain axially stationary while the rest of shifter assembly 270 moves in the axial direction toward the external rotating component. As clutch ring 330 continues to rotate and aligns with the mating teeth of the external component, then springs 340 may force the clutch ring into the desired position within shifter gear 310. During this example, axial movement of the clutch ring 330 occurs after axial movement of the shifter assembly 270 upon alignment of the teeth of the clutch ring and second shaft.

When a shift from 4×4 to 4×2 or vice versa is commanded by an external controller, a signal may be sent to controller 255, which then commands motor 251 to actuate the worm drive. In particular, controller 255 may contain computer-readable instructions stored in non-transitory memory for adjusting the shifter assembly based on the request from the control system external to the motorized disconnect assembly. As shifter gear 310 begins to rotate (via the worm drive) and moves axially as cam profile 318 is pushed by fixed cam guides 237 or 238, clutch ring 330 may resist the axial movement due to friction in the clutch teeth. A shifting force will act on clutch ring 330 as the rest of shifter assembly 270 attempts to move axially. As the clutch ring rotates, since it is connected to an external rotating component such as an axle, a torque may be generated by the clutch ring and transmitted into the rest of shifter assembly 270. This torque may cause shifter assembly 270 to rotate, thereby adding to the torque provided by motor 251 and increasing shift speed as shifter assembly 270 rotates and moves axially to its other position.

For general operation of the motorized disconnect seen in FIGS. 2 and 3, and in particular operation of shifter assembly 270, the vehicle is initially in a first drive mode. In this case, the first drive mode is 2WD or 4×2 which corresponds to the disconnect being in a disconnected position wherein the two input components are not connected via disconnect 200. A second drive mode may be 4WD or 4×4, which corresponds to the disconnect being in a connected position wherein the two input components are engaged via disconnect 200 and rotation of one of the components corresponds to rotation of the other component. Specifically, when clutch ring 330 is connected to only one of the input components, the vehicle is in the 4×2 mode. Alternatively, when the clutch ring is connected to both the input components, such as two shafts, the vehicle is in the 4×4 mode. In this way, as shifter assembly 270 moves axially by an amount determined by the motor and worm drive, clutch ring 330 also moves axially either engaging or disengaging the two rotating components. Upon detection that the shifter assembly 270 is in the requested 4×4 or 4×2 mode, controller 255 may turn off the motor.

In one example operation scheme for selectively engaging two rotating components (shafts), the vehicle may initially be in the first mode (e.g., 2WD). During this mode, shifter assembly 270 may be held in a first position. The first position may locate the shifter assembly in a position closer to seal 233, or in the negative axial direction as shown by the arrow 211 in FIG. 3. In this first position, a first shaft 207 may be engaged with the shifter assembly, in particular with clutch ring 330 while a second shaft 209 is not coupled to clutch ring 330. Then, a command may be issued by a vehicle controller to shift from the first mode (2WD) and to the second mode (e.g., 4WD). During shifting to the second mode, worm gear 234 may be driven by worm 253 powered by motor 251 to drive gear track 315. As seen in FIG. 3, the gear track 315 oscillates between the first and second ends (sides) 395 and 396, which causes the shifter assembly to slide against fixed cam guides 237 and 238, thereby moving the shifter assembly in a first axial direction (as shown by the arrow 211 in FIG. 2) to a second position where shifter assembly 270 is engaged with both the first shaft and the second shaft. Said another way, the teeth of the clutch ring 330 may be engaged with corresponding teeth of both the first shaft 207 and the second shaft 209. The second position may be located in a more positive axial direction (defined by the axial direction arrow in FIG. 2) than the first position, such that shifter assembly 270 is farther away from seal 233 in the second position than in the first position. Subsequently, a command may be issued by the vehicle controller to shift back to the first mode (2WD). As such, the motor may continue driving the worm gear in the same direction, thereby moving the shifter assembly in a second axial direction (the negative axial direction of FIG. 2, opposite of the arrow) until the shifter assembly reaches the first position in which the second shaft is again disengaged from the clutch ring 330.

In some embodiments, an additional, multi-plate clutch may be coupled in series with the shifter assembly 270 including the clutch ring 330. As one example, the multi-plate clutch (which may also be referred to as a friction clutch) may include a set of wedge plates rotationally coupled to one of the first and second shafts 207 and 209 and a set of clutch plates rotationally coupled to the other one of the first and second shafts 207 and 209. A pressure plate (e.g., piston plate) may compress the wedge and friction plates to synchronize the speeds between the first and second shafts 207 and 209. The clutch ring 330 of the shifter assembly 270 may then be used as a locking clutch to lock the first and second shafts 207 and 209 to one another, thereby fully engaging the two shafts for complete torque transfer between the two shafts. It should be noted that the multi-plate clutch described above may be included in series with any one of the motorized disconnect assemblies described herein.

The illustrated disconnects of FIGS. 2 and 3 are provided for exemplary purposes, other suitable disconnects or configurations are also considered within the scope of this disclosure. For example, while the illustrated disconnect 200 is motor driven using an electric motor, a pneumatic variant or hydraulic variant is also suitable.

Figure 4:
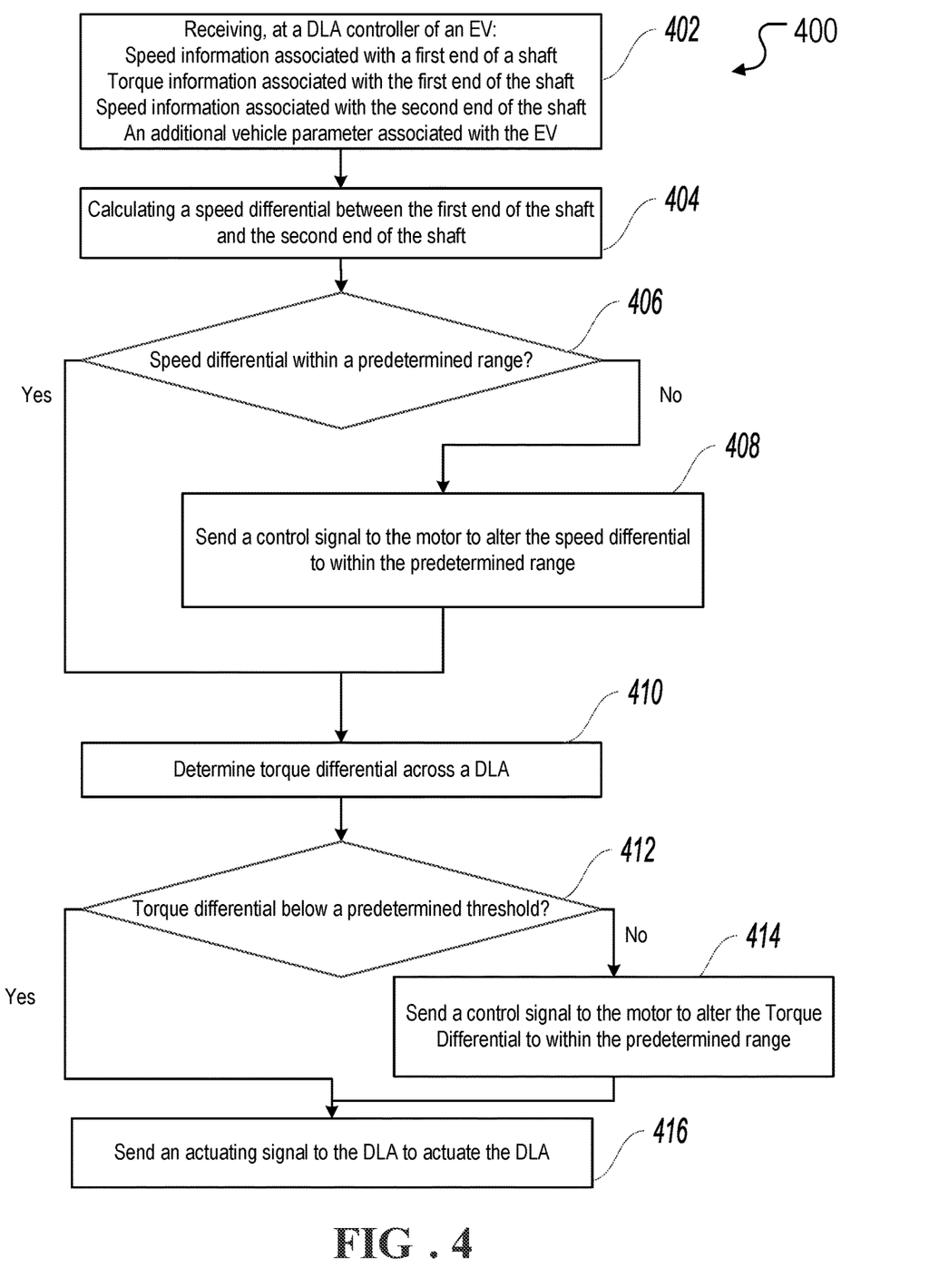
FIG. 4 is a flowchart depicting an example process for controlling a DLA in an electric vehicle.

FIG. 4 is a flowchart depicting an example process for controlling a DLA in an electric vehicle. For clarity of presentation, the description that follows generally describes process 400 in the context of the other figures in this description. However, it will be understood that process 400 can be performed, for example, by any system, software, and hardware, or a combination of systems, software, and hardware, as appropriate. In some implementations, various portions of process 400 can be run in parallel, in combination, in loops, or in any order.

A DLA controller can information regarding various parameters associated with the vehicle (402). The DLA controller can receive speed information associated with the motor end or power end of each shaft with a DLA on it. The DLA controller can additionally receive speed information associated with the wheel end of each shaft with a DLA, as well as torque and additional vehicle information. Additional vehicle information can include, but is not limited to, lighting configuration, steering inputs, throttle/power inputs, brake inputs, speed, environmental factors (e.g., weather, temperature etc.), windshield wiper condition, or other vehicle data. The DLA controller can be a part of, or subsystem associated with a vehicle ECU or main vehicle computer, or it can be a separate device, which receives inputs from the vehicle's main computer, among other things. In some instances, the additional vehicle information is received from the vehicle ECU, or sensors associated with the ECU. In some implementations, separate sensors are provided for the DLA controller. For example, a vehicle speedometer can be used in combination with a wheel diameter to determine rotational speed of a shaft connected to that wheel. In another example, a rotational encoder (e.g., a hall effect sensor or optical encoder) can be connected to the a shaft in order to measure its rotational speed. In some implementations, the rotational speed of a shaft connected to an EV motor is directly proportional to the rotational speed of the motor. In these implementations, control signals associated with the EV motor, or a speed sensor of the motor can be used to determine the rotational speed of the shaft associated with the motor. Additional inputs (E.g., brake pressure, external temperature, etc.) can be sensed using independent sensors positioned throughout the vehicle.

The received speed information can be used to calculate a differential speed across each DLA to be actuated (404). In some implementations, when the DLA is connected, the speed differential will be zero, or near zero. In some implementations, where the DLA provides gearing there will be a fixed relationship in the speed differential when the DLA is connected. When the DLA is disconnected, the wheel and the power end of the shaft can rotate independently. For example, the wheel may be rotating freely on a vehicle traveling at 60 miles per hour, and the power end of the shaft may be at a complete stop. In some instance, a low speed differential is desirable during connecting events to minimize wear on the DLA. In some cases, the speed differential should be between 25 and 250 revolutions per minute (RPM). In some instances, the ideal speed differential is around 100 RPM in order to connect the DLA from a disconnected state.

Once the speed differential is determined, it can be assessed to determine whether it is within the predetermined range for actuation (e.g., connection) of the DLA (406). If the speed is within a predetermined range, the DLA controller can determine a torque differential across each DLA to be actuated (410). If the speed differential is not within the predetermined range, a control signal can be send to the motor to adjust the speed of the power end of the shaft, and bring the speed differential to within the predetermined range (408). It should be noted that the speed differential can be too low. For example, if the DLA is disconnected, and both the power shaft and the wheel shaft are stopped (e.g., the vehicle is stopped), then attempting to actuate and connect the DLA might fail, or in some cases, damage the DLA. In some implementations, a small differential speed is required to ensure gears are able to mesh correctly upon connection of a DLA. A speed differential ensures that the faces of the gears to be meshed alternate between being face to face and face to grove, this prevents the gears from binding when attempting to mesh.

Once a torque differential has been determined across each DLA to be actuated (410) it can be assessed whether the torque differential is above or below a predetermined threshold. In some implementations, the torque differential should be below the predetermined threshold prior to disconnect the DLA in order to minimize wear or damage to the DLA and the motor. For example, if there is a large torque applied across the DLA (e.g., the wheel is under heavy load), and the DLA is disconnected, the motor could over-speed in response to the sudden loss of load. Additionally sudden loss of power to the wheel could cause a loss of vehicle control or other undesirable effects. Further disconnecting under heavy load could damage or cause excessive wear to the DLA itself.

If the torque differential is not below the predetermined threshold, a control signal to the motor to reduce or change the torque applied to the DLA to be actuated can be sent (414). Finally, when the torque differential is below the predetermined threshold, and the speed differential is within the predetermined range, an actuating signal can be sent to the DLA to actuate (e.g., connect or disconnect) the DLA (416).

Figure 5:
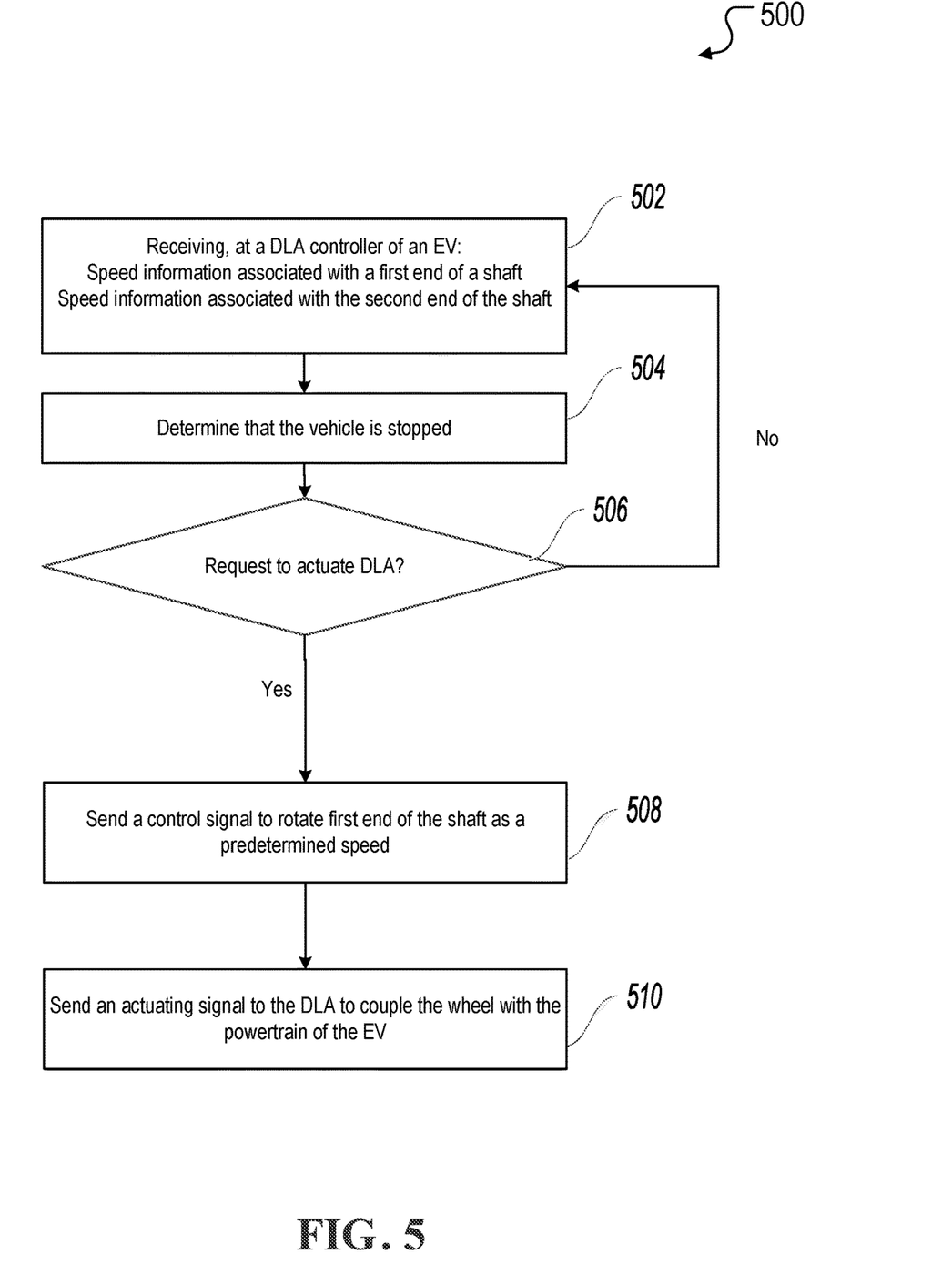
FIG. 5. Is a flowchart depicting an example process for actuating a DLA on a stationary electric vehicle.

FIG. 5 is a flowchart of an example process for actuating a DLA on a stationary electric vehicle. If a vehicle is stopped, when attempting to actuate a DLA, the interface between the two shafts may not align properly. For example, splines on the shifter may not align with grooves in the clutch plate, and therefore may prevent proper engagement of the DLA. In some instances, it is desirable to have some relative motion between the two shafts to be connected, to ensure that proper alignment occurs during the actuation of the DLA. For clarity of presentation, the description that follows generally describes process 500 in the context of the other figures in this description. However, it will be understood that process 500 can be performed, for example, by any system, software, and hardware, or a combination of systems, software, and hardware, as appropriate. In some implementations, various portions of process 500 can be run in parallel, in combination, in loops, or in any order.

The DLA controller receives speed information associated with both the first end of a shaft and a second end of the shaft (502). In some implementations, one end of the shaft (e.g., the first end) is connected to a motor of the vehicle, and the speed associated with it represents the rotational speed of the motor. In some instances, the second end of the shaft can be connected to a wheel of the electric vehicle, and the speed associated with the second shaft represents the rotational speed of the wheel. In some instances, the rotational speed information is received from the vehicle ECU, or sensors associated with the ECU. In some implementations, separate sensors are provided for the DLA controller. For example, a vehicle speedometer can be used in combination with a wheel diameter to determine rotational speed of a shaft connected to that wheel. In another example, a rotational encoder (e.g., a hall effect sensor or optical encoder) can be connected to the a shaft in order to measure its rotational speed. In some implementations, the rotational speed of a shaft connected to an EV motor is directly proportional to the rotational speed of the motor. In these implementations, control signals associated with the EV motor, or a speed sensor of the motor can be used to determine the rotational speed of the shaft associated with the motor.

The DLA controller can used the received speed information, as well as other parameters, to determine that the vehicle is stopped (504). For example if the speed associated with the wheel is zero or near zero, and GPS or accelerometer readings indicate that the vehicle is stopped, then it can be determined that there is little or no relative motion between the first shaft and the second shaft. The DLA controller can also determine that the motor shaft and/or motor is stopped. The motor shaft and motor speed can be determined using a separate speed sensor, or based on inputs provided to the motor. In this condition where the vehicle (and therefore the wheel shaft) and the motor (and therefore the motor shaft) are both stationary, directly actuating the DLA can result in improper meshing and coupling of the DLA.

If a request to actuate (e.g., connect) the DLA is received (506), the DLA controller can then proceed to actuate the DLA according to the stopped vehicle procedure. Initially, a control signal is sent to apply a small torque and rotate the first end of the shaft (e.g., the motor) at a predetermined speed (508). This can be a relatively slow speed (e.g., 1 revolution per minute, or 5 revolutions per minute, etc.). Rotating the first end of the shaft slowly creates a differential speed between the first end and the second ends of the shaft to ensure the DLA is able to connect during actuation, while ensuring there is not sufficient torque to move the vehicle once the DLA is connected. Once the first shaft is rotating at or near the predetermined speed, an actuating signal can be sent to the DLA, causing the DLA to couple the first end and the second end of the shaft, thereby coupling the wheel to the powertrain of the EV (510).

Figure 6:
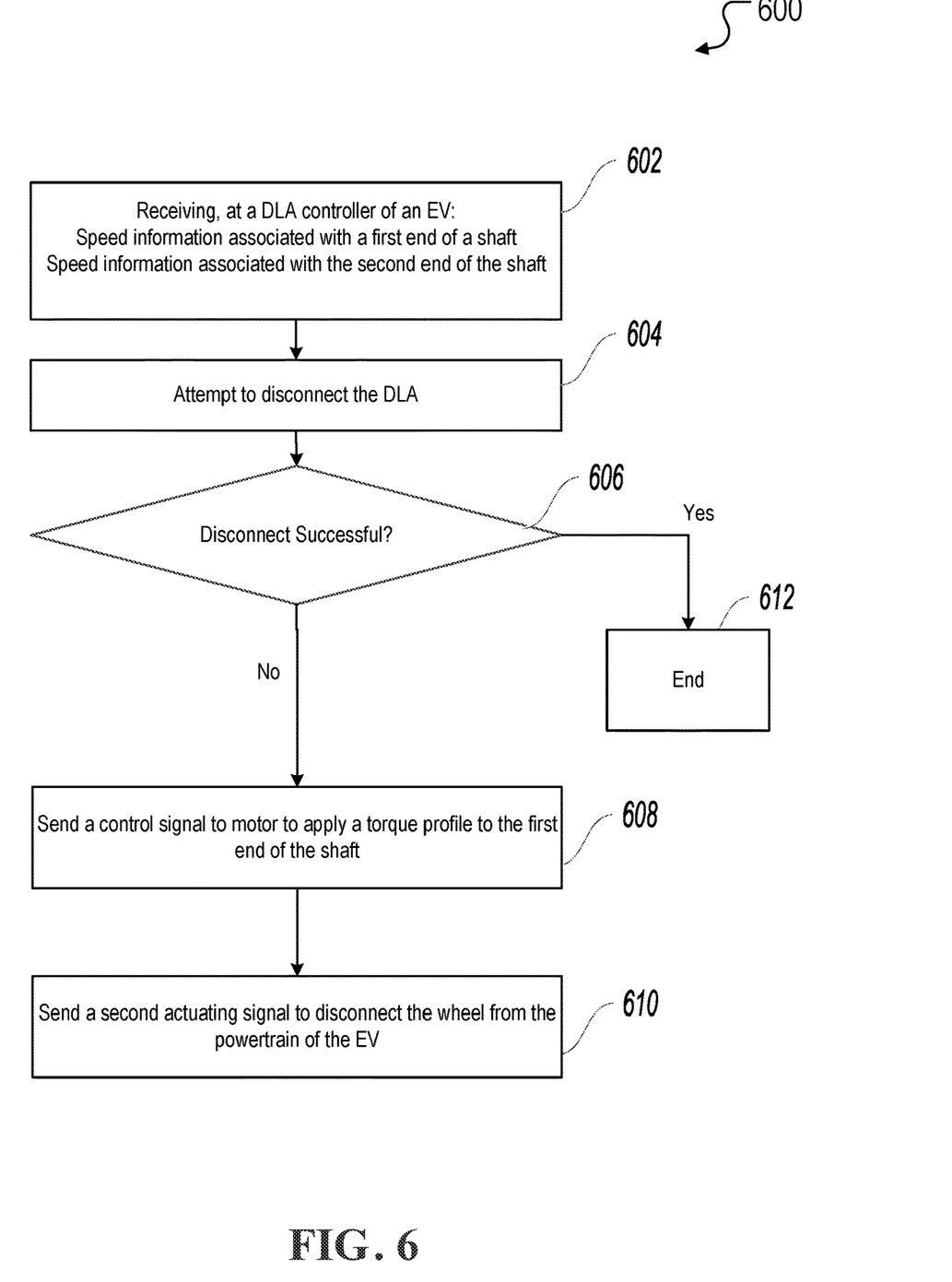
FIG. 6 is a flowchart depicting an example process for disconnecting a DLA in the event of disconnect failure.

FIG. 6 is a flowchart depicting an example process for disconnecting a DLA in the event of disconnect failure. In certain instances, the DLA may fail to disconnect when an actuating signal is sent. For example, under high torque conditions, the DLA may be unable to disconnect or may be jammed. In some implementations, the DLA controller can send a torque profile to the EV motor to alter the torque applied to the first end of the shaft, and "unstick" or free the DLA to disconnect. For clarity of presentation, the description that follows generally describes process 600 in the context of the other figures in this description. However, it will be understood that process 600 can be performed, for example, by any system, software, and hardware, or a combination of systems, software, and hardware, as appropriate. In some implementations, various portions of process 600 can be run in parallel, in combination, in loops, or in any order.

The DLA controller receives speed information associated with both the first end of a shaft and a second end of the shaft (602). In some implementations, one end of the shaft (e.g., the first end) is connected to a motor of the vehicle, and the speed associated with it represents the rotational speed of the motor. In some instances, the second end of the shaft can be connected to a wheel of the electric vehicle, and the speed associated with the second shaft represents the rotational speed of the wheel.

If an actuating signal is sent in an attempt to disconnect the DLA (604) the DLA may successfully disconnect, or the disconnect operation may fail. A determination can be made whether or not the disconnect has failed (606) based on multiple inputs. For example, if the speed between the first end of the shaft and the second end of the shaft remains equal, it is likely that the disconnect operation has failed. In certain instances, a sensor can be provided within the DLA (e.g., a magnetic sensor, reed switch, or other sensor) which indicates whether the DLA is in a coupled state or an uncoupled state. If the disconnect was successful, process 600 ends (612). If the disconnect attempt was unsuccessful the DLA controller can begin a jammed disconnect procedure.

A control signal to a motor of the EV can request that the motor apply a particular torque profile to the first end of the shaft (608). This torque profile can include one or more torque reversals. For example, a sinusoidal torque can be applied, which in essence rocks the first end of the shaft back and forth inside the DLA. In some implementations, the torque profile is determined based on measured operating conditions of the DLA (e.g., current torque applied, or other vehicle dynamics). In some instances the torque profile includes a sinusoidal torque of increasing amplitude. In some implementations, the torque profile continues for a predetermined time period (e.g., 2, 5, 10, or more seconds). In some implementations the torque profile is removed when a successful disconnect is detected. The applied torque profile effectively alters the forces from the leading or advancing side of the coupling spline teeth to the trailing or retarding side. During the transfer, a momentary period where there is very low or no force between the spline teeth and the mesh, a successful disconnect can be assured.

A second actuating signal to disconnect the DLA is then sent to the DLA (610). In some implementations, the second actuating signal can be send simultaneously with the application of the torque profile, such that the DLA attempts to disconnect while the first end of the shaft is being rocked. In some implementations, the torque profile is applied in with increasing torque (e.g., a sinusoid with increasing amplitude) while the actuating signal to disconnect is present. When a successful disconnect is detected, the torque profile can cease.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Although the disclosed inventive concepts include those defined in the attached claims, it should be understood that the inventive concepts can also be defined in accordance with the following embodiments.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this by itself should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An electric vehicle shifting control method comprising:
   receiving, by a control system of an electric vehicle, an input instructing the electric vehicle to shift from a two-wheel drive configuration to a four-wheel drive configuration;
   responsive to the input, controlling a first drive-line actuator (DLA) to initiate a first process for connecting a first wheel of the electric vehicle to a drive axle of the electric vehicle;
   waiting for a time period of 10 ms to 250 ms from initiating the first process to elapse; and
   controlling a second DLA to initiate a second process for connecting a second wheel of the electric vehicle to the drive axle, wherein the time period is shorter than a total time to complete the first process.

2. The method of claim 1, wherein the time period is at least 50 ms.

3. The method of claim 1, further comprising starting an electric motor coupled to the drive axle during controlling the first DLA to initiate the first process for connecting the first wheel of the electric vehicle to the drive axle of the electric vehicle.

4. The method of claim 3, wherein controlling the first DLA to initiate the first process for connecting the first wheel to the drive axle is performed simultaneously with starting the electric motor.

5. The method of claim 3, wherein the time period is a first time delay, and
   wherein controlling the first DLA to initiate the first process for connecting the first wheel to the drive axle is performed after a second time delay has elapsed from starting the electric motor.

6. The method of claim 5, wherein the second time delay is longer than the first time delay.

7. The method of claim 5, wherein the second time delay is between 20 ms and 500 ms.

8. The method of claim 5, wherein a ratio between the second time delay and the first time delay is between 3:2 and 8:1.

9. The method of claim 8, wherein the ratio is 2:1.

10. The method of claim 1, wherein the time period varies based on a speed of the electric vehicle.

11. The method of claim 10, wherein the time period increases as the speed of the electric vehicle increases.

12. The method of claim 1, wherein the first process comprises:
    determining a rotational speed differential between the first wheel and the drive axle;
    sending a control signal to a motor of the electric vehicle to adjust the speed differential to within a predetermined threshold; and
    sending an actuating signal to the first DLA to engage the first wheel with the axle.

13. An electric vehicle comprising:
    a first drive-line actuator (DLA) positioned on a shaft between a center of the shaft and a first wheel, the first DLA operable to couple and uncouple the first wheel to and from the shaft;
    a second DLA positioned on the shaft between the center of the shaft and a second wheel, the second DLA operable to alter an amount of torque transferred from the shaft to the second wheel, the second DLA operable to couple and uncouple the second wheel to and from the shaft; and
    a controller configured to actuate each of the first DLA and second DLA responsive to an input to shift from a two-wheel drive configuration to a four-wheel drive configuration by:
    controlling the first DLA to initiate a first process for connecting the first wheel to the shaft; and
    waiting for a time period of 10 ms to 250 ms from initiating the first process to elapse; and
    controlling a second DLA to initiate a second process for connecting a second wheel of the electric vehicle to the shaft, wherein the time period is shorter than a total time to complete the first process.

14. The electric vehicle of claim 13, wherein the time period delay is between 20 ms and 40 ms.

15. The electric vehicle of claim 13, wherein the time period is at least 30 ms.

16. The electric vehicle of claim 13, wherein the controller is further configured to apply power to an electric motor coupled to the shaft concurrently with controlling the first DLA to initiate a first process for connecting the first wheel of the electric vehicle to a drive axle of the electric vehicle.

17. The electric vehicle of claim 13, wherein the time period delay varies based on a speed of the electric vehicle.

18. The electric vehicle of claim 17, wherein the time period increases as the speed of the electric vehicle increases.

19. The electric vehicle of claim 13, wherein the first process comprises:
  determining a rotational speed differential between the first wheel and the shaft;
  sending a control signal to a motor of the electric vehicle to adjust the speed differential to within a predetermined threshold; and
  sending an actuating signal to the first DLA to engage the first wheel with the shaft.

* * * * *